Dec. 7, 1937.   M. L. GOLDBERT ET AL   2,101,430
ELECTRIC CONTROL DEVICE
Filed Feb. 5, 1935   3 Sheets-Sheet 1
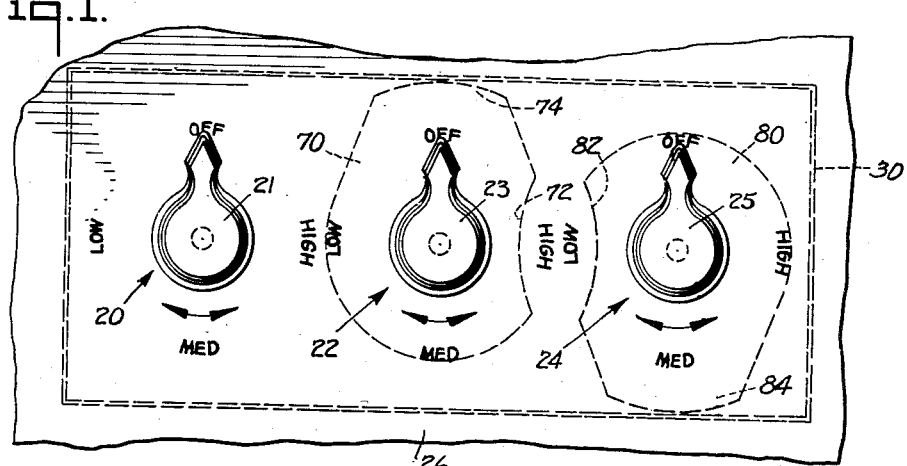
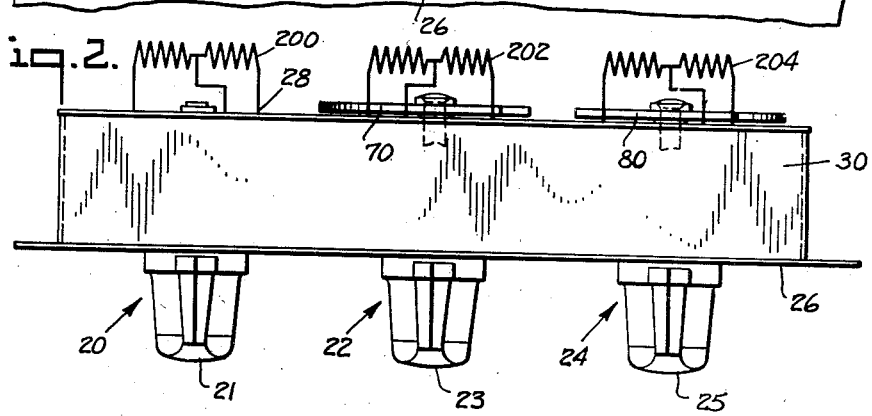
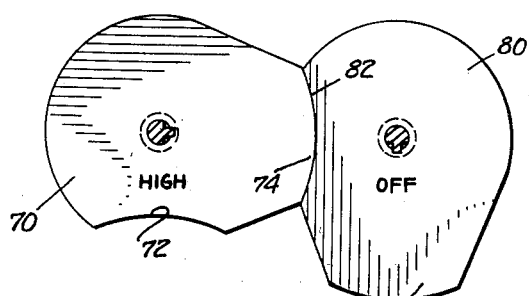
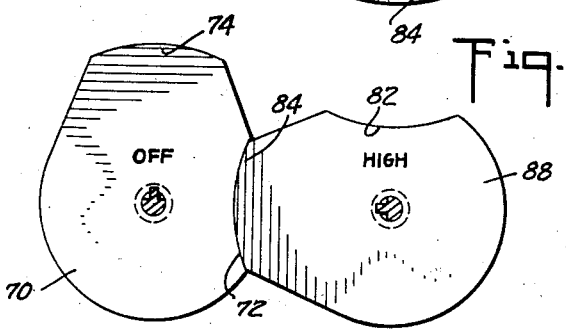
INVENTORS
MAX L. GOLDBERT
ROY T. WATTS
BY
Dyke and Scheiner
ATTORNEYS INVENTORS
MAX L. GOLDBERT
ROY T. WATTS
BY
Dyke and Schaines
ATTORNEYS Dec. 7, 1937.   M. L. GOLDBERT ET AL   2,101,430
ELECTRIC CONTROL DEVICE
Filed Feb. 5, 1935   3 Sheets-Sheet 3

INVENTORS
MAX L. GOLDBERT
ROY T. WATTS
BY Dyke and Schaines
ATTORNEYS

Patented Dec. 7, 1937

2,101,430

UNITED STATES PATENT OFFICE 2,101,430

ELECTRIC CONTROL DEVICE

Max L. Goldbert, New York, N. Y., and Roy T. Watts, Miami Beach, Fla., assignors to Electric Trading Corporation, New York, N. Y., a corporation of New York Application February 5, 1935, Serial No. 5,012

11 Claims. (Cl. 200—50)

This invention relates to electric circuits and switch control means therefor. It has particular applicability to electric cookers, but may be used in many different types of electrical apparatus, so the detailed description below of the invention as applied to an electric cooker is to be taken as illustrative and not limiting.

Where a plurality of electric elements are connected to a common current supply system, the total load taken by all the elements must not exceed the approved capacity of that supply system. (To clarify this discussion, a constant voltage on the line is assumed throughout). This danger of overload can be avoided by making the total of the maximum amperages of the various resistance elements not greater than the approved capacity for the supply system. However, in many cases it is desirable to be able to redistribute the load so that greater current can be supplied to one element and less to another, keeping the total down to the approved capacity of the supply system.

As an example, in an electric cooker having an oven and a range, it may be desired to have both on at once, each using half of the available current, or for initial heating of the oven to use all the current for the oven heater and none for the range, or to bring water to a boil in a hurry to supply all the current to the range and none to the oven.

As a practical matter, in devices intended for use by inexperienced persons or for public sale, it must be made mechanically impossible for high current to be supplied to both elements at once, so that the approved total capacity of the supply line cannot be exceeded.

It is an object of this invention to provide a wiring and switch arrangement for a plurality of elements in which the total maximum amperage for the several elements exceeds the available current supply, yet which is so arranged and constructed that the switches for the various elements can never at any one time be set at any combination of positions which will give a greater total load than the predetermined maximum.

The objects of this invention include the provision of such an arrangement in many forms and combinations. For example, there may be only two switches, each having an "on" and an "off" position, so arranged that only one of the two may be on at one time. Again each of the two may have one or several intermediate positions between "off" and "high", and the switches may be arranged either so that either one can be turned to "high" only when the other is "off" or so that either one may be turned to "high" only when the other is not in "high". Again, there may be more than two switches with interacting locks, and furthermore there may be some switches with interacting locks and some independent switches. The combination chosen will depend upon the total current available and the various purposes to be accomplished under different conditions by the several resistance elements.

In the annexed drawings I have illustrated representation embodiments of my invention, which will be described as applied to an electric cooker having an oven heater and two range heaters.

Fig. 1 is a front elevation of a switch panel;

Fig. 2 is a top view of same;

Fig. 3 shows interacting cams on the switch rotors;

Fig. 4 shows the same in different positions;

Figure 5:
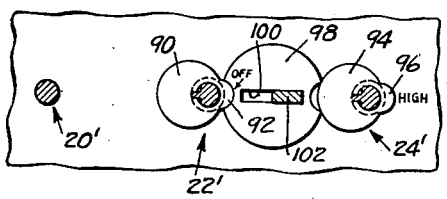
Figure 6:
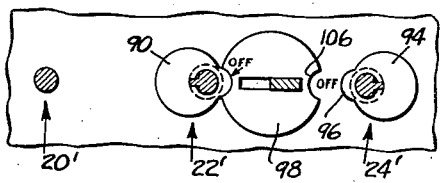
Figure 7:
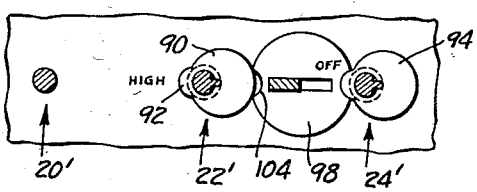
Figure 8:
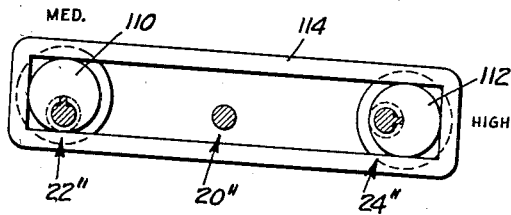
Figure 9:
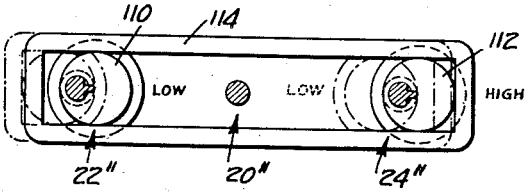
Figure 10:
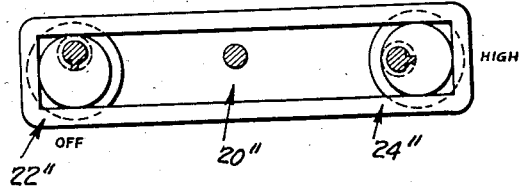

Figs. 5, 6, and 7 are more or less diagrammatic views of a second form of switch control, in different positions in the three figures;

Figs. 8, 9, and 10 are more or less diagrammatic views of a third form of switch control, in different positions in the three figures; and Figs. 11, 12, 13, and 14 are wiring diagrams which illustrate a type of switch which may be used in carrying out my invention, the switch rotors being turned to positions 90° apart in the several figures.

Reference character 20 indicates as a whole a switch wired to a low capacity first range heater 200. For example, assuming throughout a constant supply source voltage of 110 volts, this heater may carry 550 watts at "high", 225 watts at "medium", and 112½ watts at "low".

22 indicates as a whole a switch wired to an oven heater 202, which may carry 1100 watts at "high", 550 watts at "medium", and 225 watts at "low".

24 indicates as a whole a switch wired to a second range heater 204, which may carry 1100 watts at "high", 550 watts at "medium", and 225 watts at "low".

26 designates a front panel, 28 a rear panel, and 30 a side wall housing.

21, 23 and 25 indicate respectively the control knobs for switches 20, 22 and 24.

Referring to the wiring diagram, which is applicable to any one of these three switches, at the left of each figure is seen a portion 32 of a rotor 34, and fixed contacts mounted on an insulation panel 36, the rotor portion having three contact points 38, 40 and 42, of which 38 and 42 are short and 40 is long. These contact points are spaced at 90°, with 180° between 42 and 38. The three contact points on the rotor portion 32 are all electrically connected together, as by being formed integrally.

On the fixed panel surrounding the rotor are three contacts 44, 46 and 48, of which 44 and 46 are long so that they will make contact with either long or short points on the rotor, and 48 is short so that it will make contact only with a long contact point on the rotor. The contacts are spaced at 90°, with 180° between 48 and 44.

At the right is seen a rotor portion 50 and fixed contacts. In practice these two rotor portions 32 and 50 are coaxial parts of the rotor 34, one behind the other, and rotate together, while the fixed contacts seen at the right are mounted on the rear face of the panel 36 on whose front face the contacts seen at the left are mounted.

The rotor portion 50 carries three contact points 52, 54 and 56, spaced at 90°, with 180° between 56 and 52. Contact points 52 and 56 are long and 54 is short. The three contact points on the rotor portion 50 are all electrically connected together, as by being formed integrally.

On the rear face of the panel are contacts 58, 60 and 62, contacts 60 and 62 being long, so that they will make contact with either long or short contact points on the rotor portion 50, and contact 58 being short so that it will make contact with only the long contact points on the rotor portion 50. These contact points are spaced at 90°, with 180° between 62 and 58.

A positive lead is connected to contact 46, and a negative lead to contact 62. Contacts 48 and 60 are connected together, this unitary pair of contacts, one on the front face of the panel and one on the back face, being designated throughout these diagrams by the letter A.

Contact 44 is wired to the center of the resistance element, contact 48 to one end thereof, and contact 58 to the other end thereof.

Figure 11:
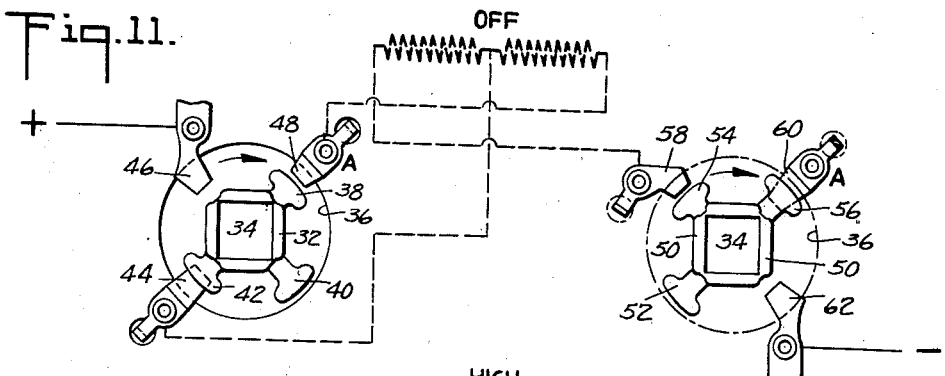

It will be seen that when the rotor 34 is in the position shown in Fig. 11 current will not flow through the element because broken at both contact 46 and contact 62, so the switch is in "off" position.

Figure 12:
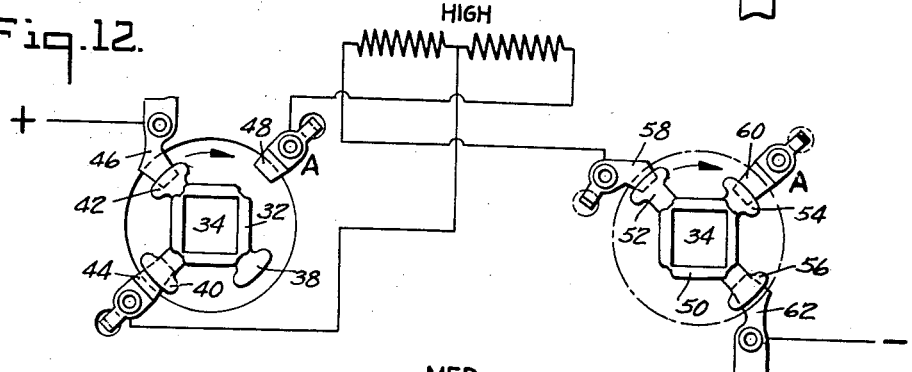

When the rotor 34 is rotated 90° to the right, as seen in Fig. 12, the current flows from contact 46 to point 42, on to point 40, and then over to contact 44 and on to the middle of the resistance coil; from there it flows in parallel, going from one end to contact 48 which is connected with contact 60 (the two "A" contacts); from there, by way of points 54 and 56, it connects with the negative lead at contact 62, and going from the other end of the resistance coil to contact 58 and from there by way of points 52 and 56 to the negative lead at contact 62. This is "high" position, with both halves in parallel, in which maximum current flows.

Figure 13:
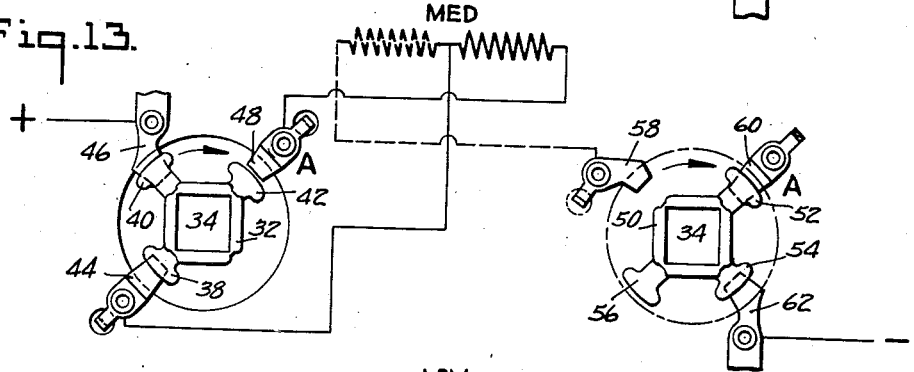
Figure 14:
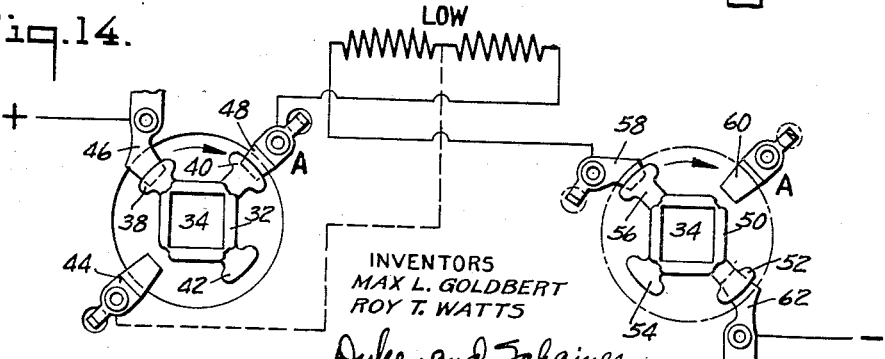

In Fig. 13 the rotor has been turned 90° further to the right. Here the positive current to contact 46 flows through points 40 and 38 to contact 44, whence it goes to the center of the resistance coil. The circuit through one end of the resistance coil leads to contact 58 but is there broken. From the other end it goes to contact 48 and its twin contact 60 (the two A's), and from there by points 52 and 54 to the negative lead at 62. This is "medium" position, with one-half on and one-half off.

In Fig. 14 the rotor has again been turned 90° further to the right, in which position positive current from contact 46 goes through points 38 and 40 to contact 48 whence it flows into one end of the resistance coil. The connection from the center of the coil to contact 44 comes to a dead end there. The connection from the other end of the resistance coil is closed, so that current flows through the length of the resistance coil and on to contact 58, and from there through points 56 and 52 to the negative lead at contact 62. Here the two halves of the resistance coil are connected in series and low current flows, this being the "low" position.

Returning now to the form of the first four figures, it will be seen that switch 20 is independent, and at any time can be turned to any position including its "high" of 550 amperes.

Keyed onto the rotor of switch 22 is a cam 70. This cam is generally circular, with an arcuate concavity 72 at one side and an arcuate convex projection 74 at another side.

Similarly, keyed onto the rotor of switch 24 is a generally circular cam 80 with arcuate concavity 82 and arcuate convex projection 84.

These two cams are so shaped and proportioned that when the concavity 72 on cam 70 faces switch 24, the body of cam 80 clears cam 70 everywhere, and projection 84 on cam 80 just rides around in the arcuate concavity 72 of cam 70. When projection 84 of cam 80 is in concavity 72 of cam 70, the cam 70 is thereby locked against turning in either direction. The exact converse of the description of this paragraph also holds, so that when the concavity 82 on cam 80 faces switch 22, the cam 70 can be turned to any angle without interference by cam 80, but when projection 74 of cam 70 fits in concavity 82 of cam 80 then cam 80 is locked against turning in either direction.

The cam 70 is keyed to the rotor of switch 22 in such relation that when that switch is in "off", its concavity is at the right, toward switch 24; when in "low" neither concavity nor projection is at the right; when in "medium" neither concavity nor projection is at the right; and when in "high" the projection is at the right.

The cam 80 is keyed to the rotor of switch 24 in such relation that when that switch is in "off", its concavity is at the left, toward switch 22; when in "low" neither concavity nor projection is at the left; when in "medium" neither projection nor concavity is at the left; and when in "high" the projection is at the left.

It follows from this construction and arrangement that when one of these two interrelated switches is in "off" the other can be set at any position; when one is in "low" the other can be set at any position except "high"; when one is in high the other can only be in "off".

Thus with the figures assumed for this embodiment, the maximum possible load conditions are as follows:

| Switch 20 | Switch 22 | Switch 24 | Total |
| --- | --- | --- | --- |
| 550 | 1100 | 0 | 1650 |
| 550 | 550 | 550 | 1650 |
| 550 | 0 | 1100 | 1650 |

Thus the maximum of 1650 amperes load can never be exceeded, and yet the oven (on switch 22) can be given 1100 amperes, or a range (on switch 24) can be given 1100 amperes. With a maximum supply source capacity of 1650 it would not be safe to arrange the switch system in such way that either selectively could have so high a load without some such automatic lock-out as we have disclosed.

Among the various modifications which can be developed from this illustrative disclosure, and which come within our invention, would be a similar cam arrangement in which the arcuate projection portion covers two or more of the switch positions on either or both of the switches, so that one switch cannot be set at any position where a projection faces the other switch except when that other switch has a concavity facing the first switch. Likewise concavities could be provided at more than one switch position on either or both of the switches. Furthermore, in this form as well as in those of Sheet 3 of the drawings, the interlocking of the switches need not be limited to two switches, but can be extended and developed to meet the particular needs of whatever apparatus the control system may be applied to.

It will be noted that each of cams 70 and 80 constitutes at once a number keyed to its own switch shaft and a lockout means or obstruction as to the other cam. Instead of combining these functions we may have the lockout means comprised by a separate member, in which case it will be actuated by each of the cams. Examples of this type of arrangement are shown in Figs. 5–7 and 8–10.

Figs. 5, 6, and 7 illustrate a second embodiment of our safety lock, which is illustrated as arranged for application to the same panel and set of switches 20, 22, and 24. As before, the switch 20 is independent, and the switches 22 and 24 are interrelated.

The rotor of switch 22 has keyed thereon a cam 90 formed as an eccentric circle with a smaller arcuate projection 92 at the small radius side. The rotor of switch 24 has a similar cam 94 with projection 96, keyed thereon. Between the two is a slide member 98 with a slot 100 on fixed stud 102, and having arcuate concavities 104 and 106 at its ends, which concavities just fit projections 92 and 96 on the switch cams. The length of the slide member is such that when projection 92 fits within concavity 104, then cam 94 can be turned to present its greatest radius directly toward the slide and it will have only working clearance. The radius of projections 92 and 96 are no greater than the longest radii of eccentrics 90 and 94.

From this relation it follows that when the projection 92, associated with switch 22, extends to the right, fitting with concavity 104, at which position switch 22 is in "off", then switch 24 can be turned to any position. But while switch 24 is set at "high" then switch 22 must remain at "off" and cannot be turned until 24 is turned out of "high".

In Fig. 6 switch 24 has been turned to "off" so that now switch 22 is free to be turned to any position, its preliminary turning camming slide 98 to the right by the action of projection 92 and subsequently by eccentric 90. In Fig. 7, 22 has been turned all the way to "high", where it now locks 24 in "off". It will be apparent that either can be in any position except "high" whenever the other is in any position except "high", either one being able to be set at "high" only when the other is at "off".

In Figs. 8, 9, and 10 is illustrated another embodiment of my invention, whose operation will be readily understood in the light of the foregoing. For convenience the independent switch 20' is here illustrated as in the center. The rotor of switch 22' has keyed thereon an eccentric 110, and the rotor of switch 24' has keyed on it an eccentric 112. A ring frame 114 surrounds these eccentrics, and may rest in annular grooves in them. The eccentrics are so related to the switch rotors that each of them at "high" position extends out away from the other. The length of the ring frame in relation to the size and spacing of the eccentrics is such that either eccentric may occupy any of its annular settings except that they cannot both be set at "high" at the same time.

It is to be understood that the various cam lock mechanisms need not be shaped exactly as shown, but need only be so shaped as to embody the features defined in the claims. As one example, in the form shown in Figs. 1–4 the concavity and corresponding depression need not be arcuate, but could each comprise a pair of arms, one at each side of the center line, whereby the same effect of locking the concavity part against turning in either direction would be accomplished. In the claims where we have spoken of high current flow positions and low current flow positions, it is to be understood that depending upon the requirements of the wiring system in which this invention is employed, the high current flow positions may comprise not only the highest position but one or more positions of next lower current flow, for example, the position shown as "medium" in this illustrative disclosure, and the low current flow positions may comprise the off position in which no current flows and one or more next higher current flow positions, for example, in some cases the illustrative "medium" position being included in the low current flow group. While some of the claims define two interrelated switches, of course a series of three or more could be made up having pairs thereof within the invention as here defined. It will be understood also that the invention as defined in the claims may be embodied in devices which have the specified switch positions in the specified relations, even though additional switch positions may also be provided in various relations.

Having illustrated and described illustrative embodiments of our invention, what we claim and desire to secure by Letters Patent is:

1. In an electric circuit, two adjacent rotary switches, each having an off position, a high position, and one or more intermediate positions, each having a position lock member keyed to its shaft, the edge portion of each of said lock members which is adjacent the other lock member when its switch is in an intermediate position, being an arc centered at the switch shaft, the radii of these arcs for the two lock members totaling substantially the distance between their centers, the portion of each of said lock members which is adjacent the other lock member when its switch is set at high, having edge parts at each side of the line through the shaft centers, which edge parts have a greater radius than the intermediate arc, and the edge portion of each of said lock members which is adjacent the other lock member when its switch is set at off, being concave on the radius of the high position portion of the other switch lock.

2. In an electric device, two rotary switches, each of said switches having a cam member keyed to its shaft, said cam members each being formed as an eccentric circle with an arcuate projection of smaller radius at the short radius side of the eccentric, a slide member between the two cams having a concavity at each end fitting the arcuate projections on the cams, the relative proportioning and spacing being such that when the arcuate projection of one cam fits in a concavity of the slide member, the other can be turned to present its longest radius to the slide-member but both cams cannot at the same time be turned to present their longest radii to the slide member, the switches each being connected so as to be in their highest current flow positions when the longest radius of their cams are presented to the slide member, and so as to be in off position when the smaller arcuate projection is presented to the slide member.

3. In an electric device, two rotary switches, each having an eccentric keyed to its shaft, a free ring frame surrounding said eccentrics, the relative proportioning and spacing of the members being such that the ring frame will not allow both switches to be turned at the same time to direct their longest radii away from each other.

4. In an electric control device, two rotary switches, each having an off position, a high current flow position, and an intermediate current flow position, a first member keyed to the first rotary switch shaft, a second member keyed to the second rotary switch shaft, a lockout means actuated by each of said members, said first switch, when set at off position, freeing its lockout means from the path of the second member so that said second switch may be set at any position, said first switch when set at its intermediate position so positioning its lockout means as to leave the second member free for its switch to be set at its intermediate position, and said first switch when set at high position interposing its lockout means in dead-center relation in the path of the second member whereby the second switch may not be set at high position when the first switch is set at high position.

5. Device of claim 4 in which said second switch, when set at off position, frees its lockout means from the path of the first member so that said first switch may be set at my position, said second switch when set at its intermediate position so positioning its lockout means as to leave the first member free for its switch to be set at its intermediate position, and said second switch when set at high position interposing its lockout means in dead-center relation in the path of the first member whereby the first switch may not be set at high position when the second switch is set at high position.

6. In an electric control device, two switches, a rotary shaft for actuating each of said switches, each having an off position, a high position of maximum current flow, and one or more intermediate positions of intermediate current flow, a cam keyed on the rotary shaft of each switch, each cam having a least projecting arc, a most projecting arc, and an arc portion of intermediate projection, the cam on the first switch, when its switch is set at high, positioning an obstruction within the locus of the cam on the second switch closer to the center thereof than the amount of projection of the most projecting portion of said second cam, whereby said second switch cannot be set at high when said first switch is set at high, the cam on said second switch, when its switch is set at high, positioning an obstruction within the locus of the cam on the first switch closer to the center thereof than the amount of projection of the most projecting portion of said first cam, whereby said first switch cannot be set at high when said second switch is set at high.

7. In an electric control device, two switches, a rotary shaft for actuating each of said switches, each having an off position, a high position of maximum current flow, and one or more intermediate positions of intermediate current flow, a cam keyed on the rotary shaft of each switch, each cam having a least projecting arc, a most projecting arc, and an arc portion of intermediate projection, the cam on the first switch, when its switch is set at high, positioning an obstruction within the locus of the cam on the second switch closer to the center thereof than the amount of projection of the intermediate arc portion thereof, whereby when the first switch is set at high the second switch is inhibited from being set at high or at the intermediate position having the intermediate cam projection, the first cam, when its switch is set at its intermediate position having the intermediate cam projection, positioning an obstruction within the locus of said second cam closer to the center thereof than the amount of projection of the most projecting portion of said second cam but farther from the center thereof than the amount of projection of the intermediate arc portion thereof, whereby when the first switch is set at its intermediate position the second switch is inhibited from being set at its high position while free to be set at its off or intermediate position, the cam on the first switch, when said first switch is set at off, being entirely clear of the locus of the cam on the second switch whereby it does not obstruct said second switch from being set in any position, the cam on the second switch, when its switch is set at high, positioning an obstruction within the locus of the cam on the first switch closer to the center thereof than the amount of projection of the intermediate arc portion thereof, whereby when the second switch is set at high the first switch is inhibited from being set at high or at the intermediate position having the intermediate came projection, the second cam, when its switch is set at its intermediate position having the intermediate cam projection, positioning an obstruction within the locus of said first cam closer to the center thereof than the amount of projection of the most projecting portion of said first cam but farther from the center thereof than the amount of projection of the intermediate arc portion thereof, whereby when the second switch is set at its intermediate position the first switch is inhibited from being set at its high position while being free to be set at its off or intermediate position, the cam on the second switch, when said second switch is set at off, being entirely clear of the locus of the cam on the first switch whereby it does not obstruct said first switch from being set in any position.

8. In an electric control device, two rotary switches, each having an off position, a high current flow position, and an intermediate current flow position, a cam keyed to the rotary shaft of the first switch, said cam having a least projecting portion corresponding to off position, a most projecting portion corresponding to high position, and an intermediately projecting portion corresponding to intermediate position, and means operatively connected with the rotary shaft of the second switch interposable within the path of the cam on the first switch preventing the setting of the first switch at high when the second switch is at high or intermediate, and preventing the setting of the first switch at intermediate when the second switch is at high.

9. In an electric control device, two rotary switches, each having an off position, a high current flow position, and an intermediate current flow position, a cam keyed to the rotary shaft of the first switch, said cam having a least projecting portion corresponding to off position, a most projecting portion corresponding to high position, and an intermediately projecting portion corresponding to intermediate position, and means operatively connected with the rotary shaft of the second switch interposable within the path of the cam on the first switch preventing the setting of the first switch at high when the second switch is at high or intermediate, and preventing the setting of the first switch at intermediate when the second switch is at high, said cam, when the first switch is set at high, blocking movement of said means into its position for high or intermediate setting of the second switch, and said cam, when the first switch is set at intermediate, blocking movement of said means into its position for high setting of the second switch.

10. In an electric control device two rotary switches each having an off position, a high current flow position, and a position of intermediate current flow, a member keyed to the rotary shaft of the first switch, which keyed member extends out to a given side a shortest distance when its switch is set at low, a longest distance to the same side when its switch is set at high, and an intermediate distance to the same side when its switch is set at intermediate position, and a locking member whose distance out to the same side of the first switch shaft is controlled by the rotative setting of the second switch shaft.

11. Device of claim 10 in which the locking member is closer to the first switch shaft than the intermediate projection of the keyed member thereon when the second switch is set at high, farther from the first switch shaft than the intermediate projection but nearer than the longest projection when the second switch is set at intermediate, and farther from the first switch shaft than the longest projection when the second switch is set at off.

MAX L. GOLDBERT.
ROY T. WATTS.